United States Patent [19]
Akamatsu

[11] 3,992,657
[45] Nov. 16, 1976

[54] AC FEED CONTROL SYSTEM
[75] Inventor: Masahiko Akamatsu, Amagasaki, Japan
[73] Assignee: Mitsubishi Denki Kabushiki Kaisha, Tokyo, Japan
[22] Filed: Dec. 16, 1974
[21] Appl. No.: 533,293

[30] Foreign Application Priority Data
    Dec. 28, 1973   Japan.................... 49-4055

[52] U.S. Cl. ............... 318/227; 318/230; 318/231
[51] Int. Cl.² .......................... H02P 5/40
[58] Field of Search .......... 318/227, 230, 231, 341, 318/345

[56]         References Cited
          UNITED STATES PATENTS

| | | | |
|---|---|---|---|
| 3,538,420 | 11/1970 | Klein | 318/227 X |
| 3,585,488 | 6/1971 | Gutt et al. | 318/227 UX |
| 3,662,247 | 5/1972 | Schieman | 318/227 X |
| 3,665,273 | 5/1972 | Enslin | 318/227 |
| 3,703,672 | 11/1972 | Bird et al. | 318/227 |
| 3,704,403 | 11/1972 | Gillett | 318/227 |
| 3,878,445 | 4/1975 | Kirkham et al. | 318/227 X |
| 3,889,167 | 6/1975 | Tanaka et al. | 318/227 |

Primary Examiner—Gene Z. Rubinson
Attorney, Agent, or Firm—Oblon, Fisher, Spivak, McClelland & Maier

[57]          ABSTRACT

An AC feed control system comprising: a plurality of solid state switches connected operationally between a power source and a load; a conduct signal allocating control device for conduct-controlling the solid state switches in a predetermined order corresponding to a command input whereby the power including an AC component is fed to the load; and means for command-controlling under the presence of progress and retrogress commands the transition of state of the conduct signal allocating control device to control a current increase and decrease rate for the load.

5 Claims, 16 Drawing Figures

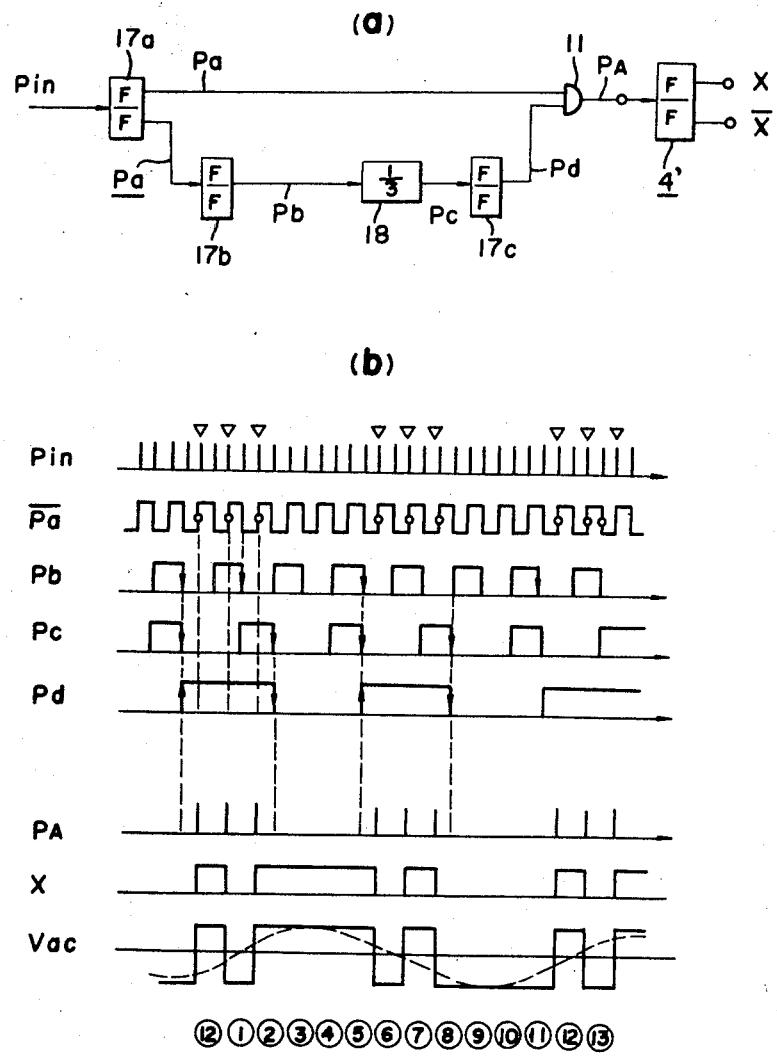

AC FEED CONTROL SYSTEM

BACKGROUND OF THE INVENTION

1. Field of the Invention

The present invention relates to an improvement of the output waveform in an inverter.

2. Description of the Prior Art

In the conventional pulse width modulation system, by turning on and off switches, the steps of an AC waveform are changed. Accordingly, low order harmonics are produced. In order to remove the low order harmonics, it is necessary to increase the filters and phases of the high-frequency modulation. A complicated power source apparatus is disadvantageously required.

In accordance with the invention, a pulse allocater for controlling a plurality of switches in a predetermined order (such as a ring counter) is provided whereby fine pulse width modulated waveforms are generated by controlling the progress and retrogress of the transposition order of the output from the pulse allocater. The control of the switches is performed to attain a fine control of the increase and the decrease of load current.

SUMMARY OF THE INVENTION

It is an object of the present invention to provide a convenient control system for decreasing the low order harmonics by controlling the increase and the decrease of AC output current so as to overcome the disadvantages of the conventional apparatus.

It is another object of the invention to provide a convenient control system for the smooth low speed revolution of an AC motor.

It is yet another object of the invention to provide a stepless control for a synchronous motor (including a stepping motor) so as to be able to stop at a desired angular turn.

The foregoing and other objects are attained in accordance with one aspect of the present invention through the provision of an AC feed control system comprising: a plurality of solid state switches connected operationally between a power source and a load; a conduct signal allocating control device for conduct-controlling the solid state switches in a predetermined order corresponding to a command input whereby the power including an AC component is fed to the load; and means for command-controlling under the presence of progress and retrogress commands the transition of state of the conduct signal allocating control device to control a current increase and decrease rate for the load.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 11a is a diagram of another embodiment of the invention; and

FIG. 11b shows waveforms of pulses for illustrating the operation.

DETAILED DESCRIPTION OF THE PREFERRED EMBODIMENTS

Figure 1:
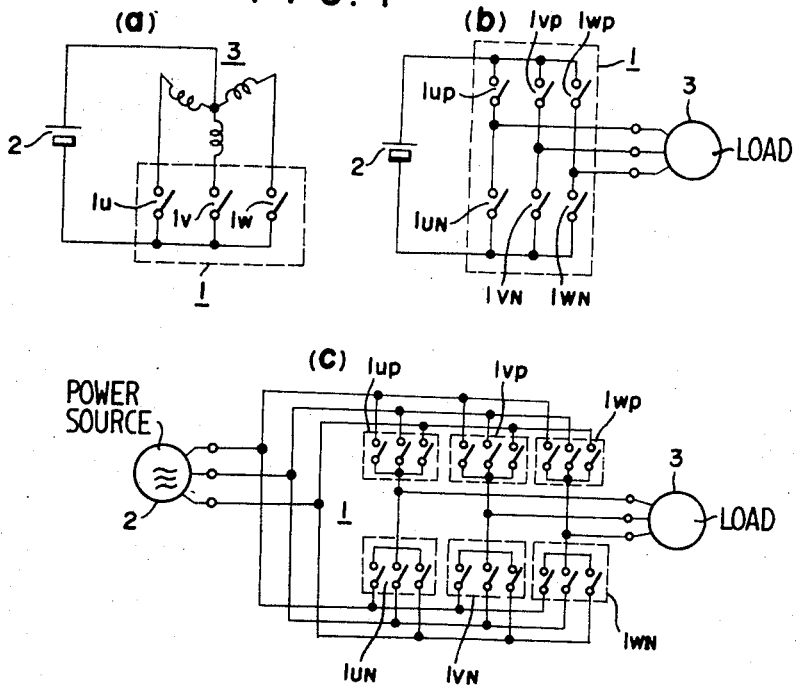
FIGS. 1a, 1b, 1c are circuit diagrams of embodiments of switches of a feeder used for the invention.
Figure 2:
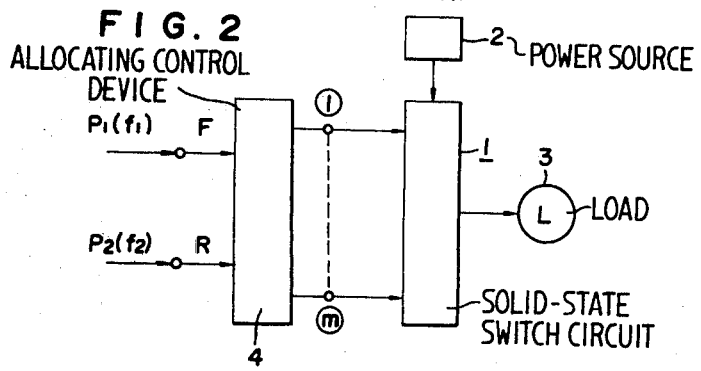
FIG. 2 is a diagram of one embodiment of the invention.

Referring now to the drawings, wherein like reference numerals designate identical or corresponding parts throughout the several views, and more particularly, to FIG. 2 thereof, FIG. 2 shows one embodiment of the invention wherein a solid state switch circuit 1 is operatively connected between a power source 2 and a load 3 which receives power including at least one AC component. Typical examples of the circuits are inverters and cycloconverters shown in FIGS. 1a–c.

In FIG. 1, the solid state switches $1u - 1w$ and $1up - 1wn$ are shown as contact switches but they can be various types of electric valves such as transistors, thyristors, and they can be connected in various forms. The switch 1 is turn-on controlled in a predetermined order for feeding AC power to the load so that a turn-on signal allocating control device 4 for applying the conduct command signal in a predetermined order to the switches is provided. The turn-on signal allocating control device 4 can be composed of a ring counter as a main component and, if necessary, can include a logical circuit.

In the embodiment of FIG. 2, the allocating control device 4 is a reversible ring counter which has a progress shift-pulse input terminal F and a retrogress shift pulse input terminal R. In the other input system, there is a reversible ring counter having a common shift pulse input terminal and at least on progress-retrogress determining input terminal. Incidentally, there is a corresponding relation of one to one in the feed connecting state of the feed to the load 3; and the turn-on state of the switches 1; and the output command state of the allocating control device, that is, the ring counter states (plural output states). That is, the states are symmetrical to the corresponding electrical phase points or zones if considered as an output AC frequency system. Accordingly, the states correspond to the static balanced points (or rotary angle) of the magnetic axis in the rotating magnetic field of an AC motor drive.

Figure 3:
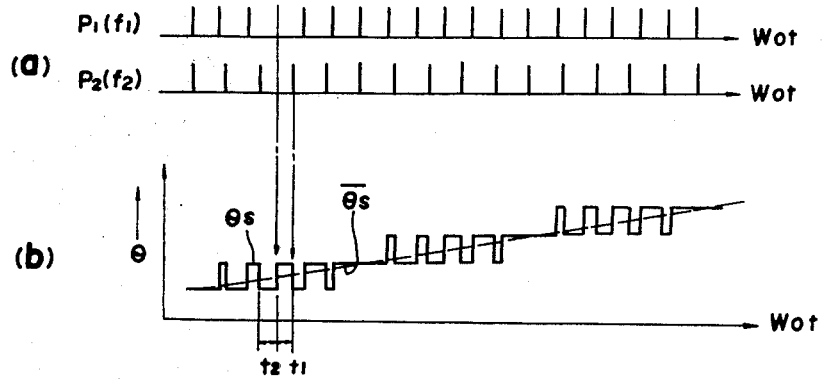
FIGS. 3a, 3b show the operation of the embodiment of FIG. 2.

The operation of this embodiment of this invention will now be illustrated based on this fundamental consideration. In the embodiment of FIG. 2, one of two pulse trains $P_1(f_1)$ of $P_2(f_2)$ which have different pulse frequencies if the progress pulse input and the other is the retrogress pulse input. The pulse train waveform in the case of $f_1 > f_2$ is shown in FIG. 3a wherein the time $\omega_0 t$ is in conversion of the electrical phase of output AC and is in abscissa and the command angle realized by the allocating control device 4 shows the steps $\theta_s$ as illustrated in FIG. 3b. this $\theta_s$ is also considered as the electrical angle and corresponds to the analogue value converted from the digital value such as the ring counter content and to the statical balance point of the rotating magnetic field (or rotary angular position). Also, $\theta_s$ corresponds to the number of pulses plus the number of progress shift pulses $P_1$ minus the number of retrogress shift pulses $P_2$. In many combinations of a discrete duty incremental type ring counter, an equal divisional electrical angle stepping type switch circuit and a load, one pulse corresponds to $2\pi/m$ (rad) in the cases of m steps (divisions). In general, there is a linear relationship that any electrical angle per any one pulse is the same. Because of the style of the connection between, or the constants of, the allocating control device 4, the switch circuit 1, the load 3 or the power source 2, there are many exceptions with the result that the linear (proportional) relationship is not always realized.

As a result of the operation already illustrated, the transistion of state of the allocating control device of FIG. 3b such as the transistion of the output state of the ring counter rotates in the fluctuation of the vector as shown in FIG. 3b when the voltage or current applied to the load 3 in FIG. 2 is shown by vector. Accordingly, the mean (average) vector rotary angle $\bar{\theta}_s$ varies smoothly as the broken line of FIG. 3b and the low order harmonics are decreased. That is, the output voltage (current) is pulse width modulated. When both pulse train frequencies are equal ($f_1 = f_2$) at a certain time, it is fixed to one phase $\omega_0 t = \bar{\theta}_s{'}$ which depends upon a predetermined algebraic sum of the pulses to that time. At the time $f_1 = f_2$, the phase difference of the pulse trains $P_1$ and $P_2$ is fixed in the state corresponding to $\bar{\theta}_s{'}$. The applied voltage vector is repeated up and down by the frequency $f_1 = f_2$. The duty ratio of the time $t_1$ in the progress position to the time $t_2$ in the retrogress position corresponds to the phase difference between $P_1$ and $P_2$, that is, the predetermined output value $\bar{\theta}_s{'}$. The mean voltage vector rotary position at the time is a predetermined output phase $\bar{\theta}_s$.

In this manner, the algebraic sum of the pulse trains $P_1$ and $P_2$ corresponds to the mean rotary position of the vector of a desirable output voltage or current. The vector can be continuously changed by an instantaneous phase difference between the pulse trains $P_1$ and $P_2$ even in a static state. The rotary rate of the output vector can be controlled by the frequency difference $(f_1 - f_2)$ of the two pulse trains. If the values of $f_1$ and $f_2$ are large enough to that of the time delay of the circuit, the AC output current has a substantially continous waveform. If the valves of the $f_1$ and $f_2$ are large enough to that of the delay caused by the inertia of the AC motor, even though the current is in a step state, the motor can be continuously and smoothly rotated under the state where the rotary rate and the rotary angle correspond to the mean value.

Figure 4:
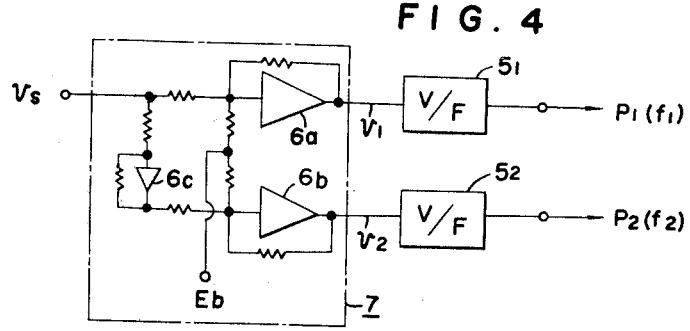
FIG. 4 is a circuit diagram of one embodiment of a double pulse train generating apparatus used in the input side of the embodiment of FIG. 2.

FIG. 4 shows one embodiment of a double pulse generator for imparting two pulse trains $P_1(f_1)$ and $P_2(f_2)$ having different frequencies. In FIG. 4, variable frequency pulse generators (voltage-frequency converter, etc.) 51 and 52 are controlled by the differential inputs $V_1$, $V_2$ for which operational amplifiers $6a-6c$ are provided. The output of the operational amplifier $6b$ is controlled by the input inverted by the operational amplifier $6c$. The differential inputs $V_1$, $V_2$ are differentially changed by the speed input $V_s$. In FIG. 4, the bias input $E_b$ equally affects the differential inputs $V_1$, $V_2$.

Figure 5:
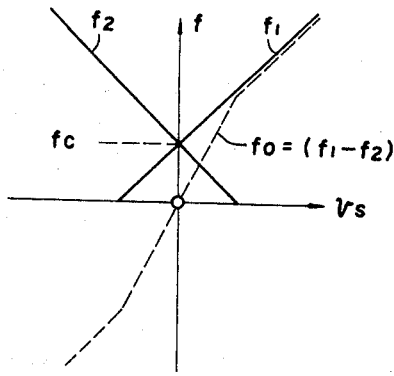
FIG. 5 is a graph of a curve showing the frequency relation of the input double pulse trains of the embodiment of FIG. 2 and showing the region having a frequency relationship in various applications.

Because of the structure described above, the frequencies $f_1$ and $f_2$ are changed by the speed input $V_s$ as shown in FIG. 5. The output AC frequency $f_0 = (f_1 - f_2)$ is given as shown in the dotted line. In the region of $f_0 > 0$, the rotary direction of the allocating control device is retrogress, that is, the retrogress movement. Accordingly, the AC motor can be continuously rotated in the progress direction and the retrogress direction.

The frequency $f_c$ at the point of $f_1 = f_2$, corresponds to the frequency for repeating progress and retrogress when the output frequency is zero and to the carrier frequency in the output pulse width modulation. When it is desired to decrease the low order harmonics in the constant frequency AC output feeding operation, the frequency $f_c$ can be selected to be higher than the output frequency. When it is desired to smooth the low velocity region of the AC motor, the torque pulsating is kept higher than the frequency (such as about 1/10 of the rated output frequency). In practice, it can be about ½ – 1 of the rated frequency. In the low frequency region only, it can be controlled by the control system of the invention. In the case of a high frequency AC motor such as a stepping motor, it is unnecessary to switch the control system if one of the pulse frequencies becomes zero at a certain velocity in the operation as in FIG. 5.

When a switch 1 which is switchable in high speed and high frequency corresponds to a desired highest output frequency, the progress and retrogress control is carried out in all the region $$[(f_1 + f_2)/2 >> |(f_1 - f_2)|].$$

Figure 6:
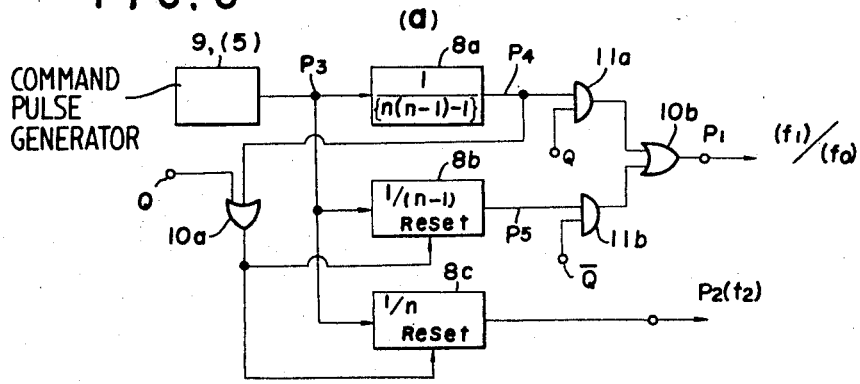
FIGS. 6a, 6b are diagrams of other embodiments of double pulse train generating apparatus used in the embodiments of FIG. 2.
Figure 6:
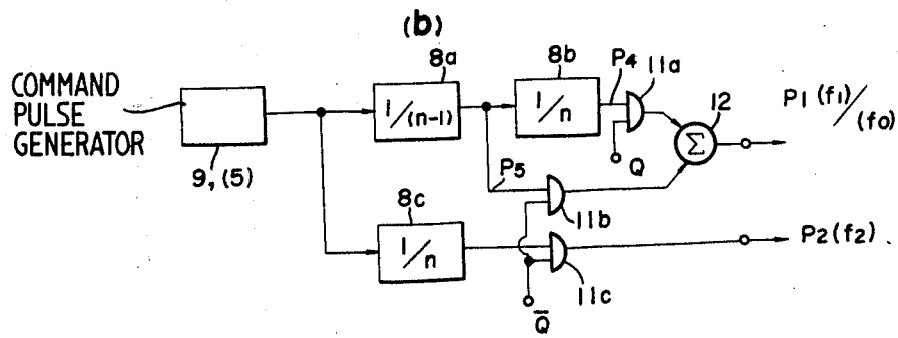

FIGS. 6(a), (b) show other embodiments of a double pulse train generator applied to the embodiment of FIG. 2. In FIGS. 6(a), (b), the reference numeral 9 designates an original command pulse generator which is a digital command device which can be the same as the variable frequency pulse generator 5 of FIG. 4. It has three frequency dividers 8a, 8b, 8c for dividing the frequency of the original command pulse train $P_3$(counters). The frequency dividing ratio of the frequency divider 8c is $1/n$, and those of the frequency dividers 8a, 8b are $1/(n-1)$ and $1/\{n(n-1)-1\}$. The frequency dividing ratio of the frequency divider 8a can be $1/n(n-1)$ when means for preventing a counting error from overlapped pulses is provided in the following pulse trains composing part of the allocater of FIG. 2.

The OR element 10a and the AND gate elements 11a, 11b are used for stopping the progress and retrogress control by the progress and retrogress control stop signal Q. When the output frequency of the constant frequency AC feed is lower than the allowable switching rate for the switch 1, it is unnecessary to use the OR elements 10a and the AND gate elements 11a, 11b. The output pulse train $P_2$ of the frequency divider 8c is transmitted to the retrogress input terminal R of FIG. 2 as the pulse train for the frequency $f_2$ of FIG. 2. The output pulse trains of the frequency dividers 8a, 8b are composed through the OR elements 10b and are transmitted to the progress input terminal F of FIG. 2 as the pulse train of the first frequency $f_1$.

Figure 7:
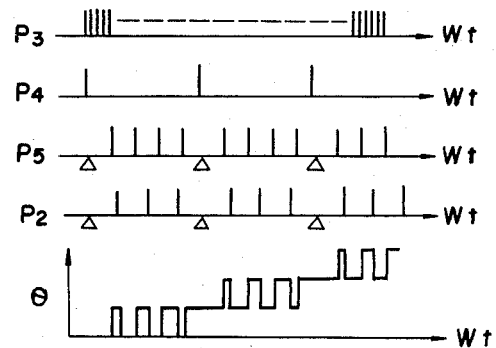
FIG. 7 shows pulses for illustrating the operation of the embodiments of FIG. 6.

The operation of FIG. 6a is shown by the relation of times of the pulse trains in FIG. 7. In FIG. 7, the time shown by the symbol $\Delta$ is the time for applying the output pulse. At this time, the frequency dividers 8b, 8c are reset and generate no output. As stated above, the frequency dividing ratio of the frequency divider is selected to be $1/\{n(n-1)-1\}$ and is reset at the time just before the pulse is generated as an output signal before only one pulse from the original command pulse $P_3$ and the counting operation is restarted from the beginning. When the frequency dividing ratio of the frequency divider 8a is selected to be $1/n(n-1)$, all of the frequency dividers 8a – 8c generate output pulses at the same time. Accordingly, the above-mentioned operation for the simultaneous pulse addition and subtraction is required. The sum of pulses P4, P5 of FIG. 7 corresponds to the progress pulse $P_1$. Accordingly, the conduct command state change of the allocator 4 and the AC output vector rotary angle $\theta$ of FIG. 7. is same as $\theta$ of FIG. 3.

FIG. 6(b) is one embodiment of the series frequency dividing system which is equivalent to that of $1/n(n-1)$ of the frequency dividing ratio of the frequency divider 6a. The pulse train addition device 12 can add overlapped input pulses. This different frequency $f_o = (f_1 - f_2)$ for deciding the output frequency in FIGS. 6(a), 6(b) is divided by $1/n(n-1)$ of $P_3$. When the output frequency is changed, the frequency of the output pulse $P_3$ of the original command pulse train generator 9 or 5 may be continuously changed. When it is changed stepwise, the frequency dividing coefficient $n$ may be changed. Broad changes can be attained by the combination of the continous change and the stepwise change.

For an AC motor control, in the high frequency output region (the torque pulsating is troublesome), only the desirable frequency progress pulse $P_1$ can be used by providing the progress and retrogress stop signal Q whereby the switching operation of the switch 1 can be decreased and the turn-off operation of the thyristor switch and the switching power of the surge absorbing circuit of the transistor can be simplified.

Figure 8:
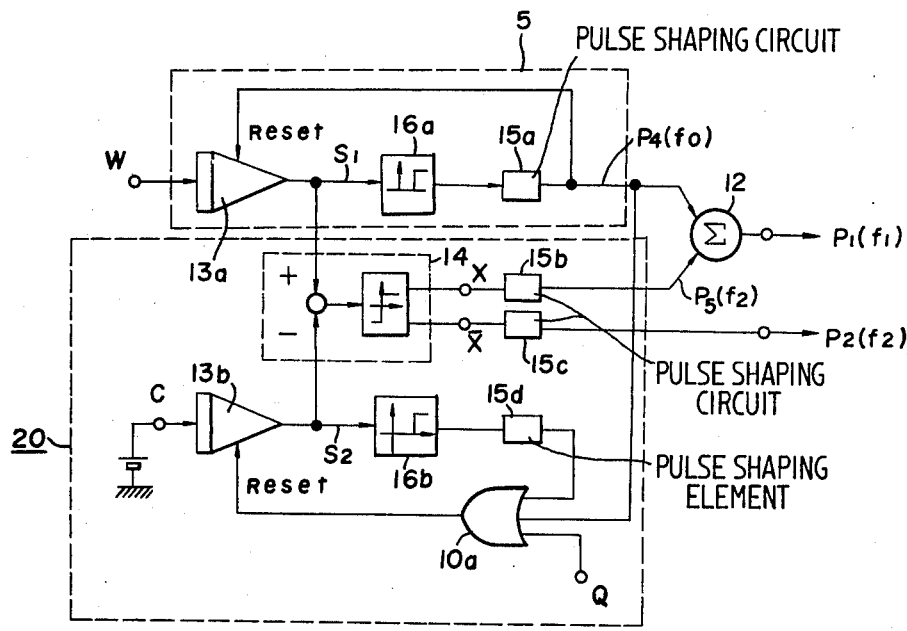
FIG. 8 is a diagram of another embodiment of the double pulse train generating part used for the embodiment of FIG. 2.

FIG. 8 shows another embodiment of the double pulse train generator for the embodiment of FIG. 2. In FIG. 8, the reference 13a designates an integrating device element of the variable frequency pulse generator 5 for generating an AC output frequency deciding pulse train $P_4(f_0)$; 16a designates a comparator element thereof; 15a designates a pulse shaping circuit thereof (unistablemultivibrator, etc.) which resets the integrating device element 13a to generate repeated pulses. The integrating device element 13a generates the first period saw tooth wave $S_1$. The operation waveforms are shown by the dotted line $S_1$ and $P_4$ in FIG. 9a. On the other hand, an integrating device element 13b, a comparator element 16b and a pulse shaping element 15d generate the second period saw tooth wave $S_2$. The OR element 10a is for forcible synchronous reset of the pulse $P_4$ and is for the progress and retrogress control operation stop signal Q.

Figure 9:
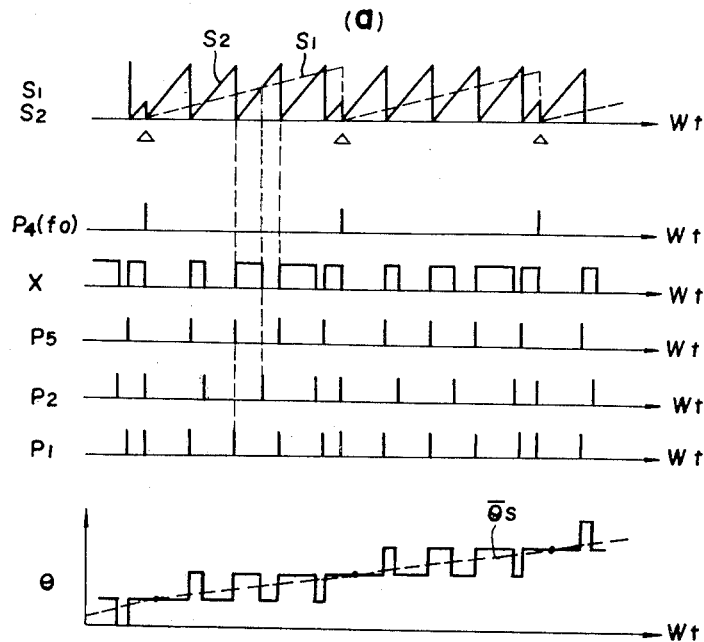
FIG. 9 is waveforms of pulses for illustrating the operation.
Figure 9:
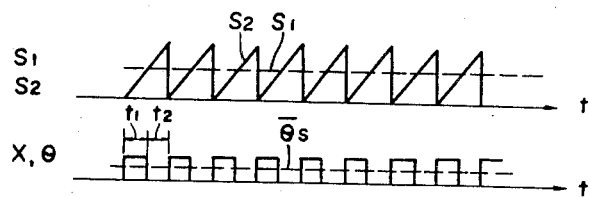

During the progress and retrogress control operation, the saw tooth waveform $S_2$ is shown by the full line $S_2$ in FIG. 9(a). At the point at which the pulse $P_4$ is generated in FIG. 9(a). (pulse generating point of the variable frequency pulse generator 5), the integrating device element 13b is also reset. The output of the integrating device element 13a, that is, the first period saw tooth wave $S_1$, and the output of the integrating device element 13b, that is, the second period saw tooth wave $S_2$, are compared by the comparator 14 to give the pulse width modulated wave signals X, $\overline{X}$ (shown in FIG. 9a). The rising and falling of the pulse width modulated signal X are taken up from the pulse width modulated signals X, $\overline{X}$ through the pulse shaping circuits 15a, 15b to give the pulses $P_5$, $P_2$ (FIG. 9(a)). The addition of the pulses $P_4$ and $P_5$ yields the progress pulse $P_1(f_1)$(FIG. 9(a)). When they are used for the input pulse trains of the embodiment of FIG. 2, the rotary angle $\theta$ of the AC output vector is given as shown in FIG. 9(a) and the same result as that of FIG. 3b is attained. Accordingly, the input $\omega$ of the integrating device element 13a is proportional to the AC output frequency.

The input C of the integrating device element 13b is a fixed value, and decides the natural period of the second saw tooth wave $S_2$. Accordingly, the pulse width modulation frequency and the progress and retrogress repeating frequency are determined. In FIG. 9(a), when the input $\omega$ of the integrating device element 13a increases, the retrogress pulse number (operation turns of the comparator 14) gradually decreases until it reaches zero. That is, when the period of the first saw tooth wave $S_1$ becomes shorter than the period of the second saw tooth wave $S_2$, the voltage increase rate of $S_2$ becomes shorter than that of $S_1$ whereby the comparator 14 is not inactivated. In order to forcibly stop the progress and retrogress, the stop signal Q is applied to fix the integrating device element 13b in the reset state. In FIG. 8, when the input $\omega$ of the integrating device element 13a is zero, it stops at a predetermined integrated output $S_1$. This operation is shown in the relationship of $S_1$ and $S_2$ of FIG. 9b. Accordingly, the pulse width modulated output X and the rotary angle $\theta$ of the AC output vector are given as shown in FIG. 9b.

The allocator 4 operates to give progress and retrogress corresponding to the pulse width modulated signal with a common frequency in the progress and retrogress operation. The mean value $\overline{\theta}_s$ is the time mean rotary angle of the magnetic flux of the Ac motor rotary magnetic field of the stop position. The stop position corresponds to the stop position $S_1$ of the integrating device element 13a and can be continuously controlled in analogue, that is, stepless rotary controllable. In this period, the DC current corresponding to the predetermined phase $\overline{\theta}_s$ is fed to each phase by the AC output current.

In FIG. 8, it is not always necessary to give a synchronous state for the first saw tooth wave $S_1$ and the second saw tooth wave $S_2$. The pulse position modulator 20 is composed of the OR element 10a, the integrating device element 13b, the comparator 14, the pulse shaping elements 15b, 15c, 15d and the comparator element 16b. For the variable frequency pulse generator 5 and the second saw tooth wave generators 13b, 16b, 15d, a simple circuit such as unijunction transistor type relaxation oscillator can be used. Since the pulse width modulator includes the second saw tooth wave generators and the comparator 14, it is possible to use various other pulse width modulators or a duty ratio controlling device such as a variable delay circuit, a pulse shifter, etc.

In the above embodiments, the embodiment having the allocating control devices having two input terminals for the progress pulse train and the retrogress pulse train has been illustrated. The allocating control device 4 can have a common shift pulse train input terminal T and a progress and retrogress deciding input terminal D (or separate movement deciding input terminals F', R').

Figure 10:
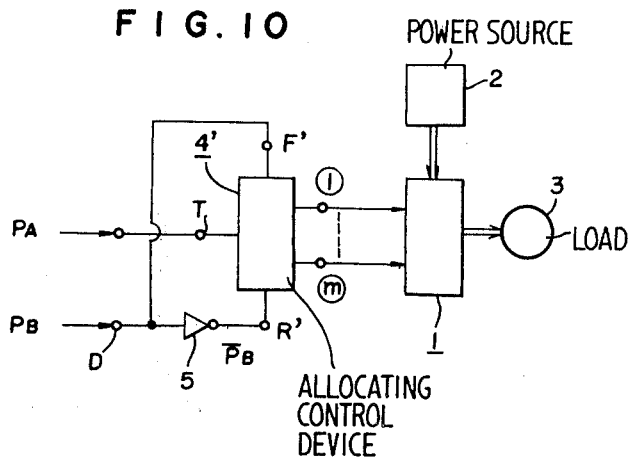
FIG. 10 is a diagram of another embodiment of the invention.

FIG. 10 shows one embodiment of the invention wherein either the operation of the input pulse $P_A$ as the progress pulse or the retrogress pulse is determined by the input pulse $P_B$. The progress and retrogress input pulses $P_1$, $P_2$ for the embodiment of FIG. 2 can be converted to the input pulses $P_A$, $P_B$ of the embodiment of FIG. 10. Moreover, it is possible to modify them to a desirable plurality of pulse trains applied to input terminals. In the above embodiments, the case of $m = >3$, the output command state number of the allocating control device 4 (or the state number of the combination of ON-OFF of the switches 1 that is the feed state number to the AC load 3), was illustrated. In the case of $m = 2$, the switch $1_1$ is in the ON state and the switch $1_2$ is in the OFF state or the switch $1_1$ is in the OFF state and the switch $1_2$ is in the ON state, the phase rotary directions, that is, the progress and retrogress directions, are not distinguished.

FIG. 11(a) shows the embodiment of the invention wherein the references 17a–17c designate flip-flops; 18 designates a frequency divider having a frequency dividing ratio of ⅓; and 11 designates a logical product element. FIG. 11(b) shows the relation of the operation of the pulse input-output $P_{in}$, $\bar{P}a$ (Pa), Pb, Pc, Pd and the output X ($\bar{X}$) of the final allocating control device (flip-flop) 4'. The pulse having the mark Δ in the input pulse $P_{in}$ is used as the shift pulse $P_A$ by the devices whereby the output $\bar{X}$ of the allocating control device 4 is changed as shown in FIG. 11(b). As a result, the AC output voltage $V_{ac}$ has a waveform which contains only a small amount of low order harmonics. It is also possible to shift pulse $P_A$ by the method of using 12 step counters. For example, the output pulse state conversions at the steps of ⑫,①,②,⑥,⑦,⑧ are pulse-shaped. In accordance with the invention, AC voltage or current having small low order harmonics can be fed by the allocating control device state shift operation witout using a complicated pulse width modulation method whereby the smooth rotary control of the AC motor can be attained. The operation can be attained by the simple pulse train pretreatment, especially by a differential operation in the double pulse trains. The double pulse trains can be given by the combination of a pair of pulse width modulation means or by the combination of two variable frequency pulse generators (such as a voltage frequency converter) and the smooth progress and retrogress rotation of the AC motor can be continuously performed. The invention imparts excellent AC feed as well as excellent stepless control of the AC motor.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An AC feed control system comprising:
   a power source,
   a load,
   a plurality of solid state switches,
   a conduct signal allocating control device having a progress input, a retrogress input and an output,
   means connecting the power source to the load through the plurality of solid state switches,
   means connecting the output of the conduct signal allocating control device to the plurality of solid state switches to control the plurality of solid state switches,
   means for generating a progress signal and a retrogress signal,
   means for connecting the progress signal to the progress input and the retrogress signal to the retrogress input to control the transition of state of the conduct signal allocating control device to control the increase and decrease rate for the load.

2. The AC feed control system according to claim 1 comprising a first pulse train generator and a second pulse train generator wherein at least one of the pulse train generators is a variable pulse frequency type generator and the state of the conduct signal allocating control device is made to progress by one of the pulse train generators and the state of the conduct signal allocating control device is made to retrogress by the other pulse train generator.

3. The AC feed control system according to claim 2 wherein at least one of the pulse train generators is a variable frequency pulse generator which is controlled by an analogue input and the current increase and decrease rate for the load is analogue controlled.

4. The AC feed control system according to claim 2 comprising a third pulse train generator and at least two pulse frequency dividing circuits having different frequency dividing ratios which receive output pulses of the third pulse train generator as an input wherein the state of the conduct signal allocating control device is made to progress by the output pulse train of one of the frequency dividing circuits and the state of the conduct signal allocating control device is made to retrogress by the output pulse train of the other frequency dividing circuit.

5. The AC feed control system according to claim 1 comprising a variable frequency pulse generator including at least an integrating functional element and a pulse position modulator for pulse position modulation by the integrated signal of the integrating functional element as an input wherein the state of conduct signal allocating control device is made to progress by the composed pulse train of the output pulse train of the variable frequency pulse generator and the first modulated pulse train of the pulse modulator and the state of the conduct signal allocating control device is made to retrogress by the second pulse train of the pulse position modulator.

* * * * *